(12) United States Patent
Choi et al.

(10) Patent No.: US 12,235,434 B2
(45) Date of Patent: Feb. 25, 2025

(54) METHOD AND DEVICE FOR ACQUIRING IMAGE BY USING LIGHT-EMITTING ELEMENT ARRAY

(71) Applicant: SMALL MACHINES, Seoul (KR)

(72) Inventors: Jun Kyu Choi, Seoul (KR); Hyung Jin Oh, Seoul (KR); Jin Kyu Seo, Uiwang-si (KR); Oh Jun Gwon, Seoul (KR); Kyung Hun Lee, Daejeon (KR)

(73) Assignee: SMALL MACHINES, Seoul (KR)

( * ) Notice: Subject to any disclaimer, the term of this patent is extended or adjusted under 35 U.S.C. 154(b) by 183 days.

(21) Appl. No.: 17/922,715

(22) PCT Filed: May 3, 2021

(86) PCT No.: PCT/KR2021/005567
§ 371 (c)(1),
(2) Date: Nov. 1, 2022

(87) PCT Pub. No.: WO2021/225345
PCT Pub. Date: Nov. 11, 2021

(65) Prior Publication Data
US 2023/0236406 A1 Jul. 27, 2023

(30) Foreign Application Priority Data
May 4, 2020 (KR) .................. 10-2020-0053223

(51) Int. Cl.
*G02B 21/36* (2006.01)
*G02B 21/12* (2006.01)
(Continued)

(52) U.S. Cl.
CPC ......... *G02B 21/361* (2013.01); *G02B 21/125* (2013.01); *H04N 23/20* (2023.01);
(Continued)

(58) Field of Classification Search
None
See application file for complete search history.

(56) References Cited

U.S. PATENT DOCUMENTS

| 10,222,605 B2 | 3/2019 | Kim et al. |
| 2014/0118529 A1 | 5/2014 | Zheng et al. |

(Continued)

FOREIGN PATENT DOCUMENTS

| AU | 2013338193 A1 | * 5/2015 | ........... G02B 21/365 |
| CN | 106204466 A | * 12/2016 | ............. G06T 5/002 |

(Continued)

OTHER PUBLICATIONS

Partial Supplementary European Search Report issued Apr. 24, 2024 in European Application No. 21800469.5.
(Continued)

*Primary Examiner* — Stefan Gadomski
(74) *Attorney, Agent, or Firm* — Sughrue Mion, PLLC

(57) ABSTRACT

Disclosed are a method of acquiring an image using a light-emitting element array and an apparatus therefor. The method of acquiring an image using a light-emitting element array includes reconstructing a first image from some images among source images, detecting a partial region containing a detection target object from the first image, acquiring partial-region images corresponding to the partial region from each of the source images, and reconstructing a second image from the partial-region images using the FPMP.

14 Claims, 17 Drawing Sheets

(51) Int. Cl.
  *H04N 23/20* (2023.01)
  *H04N 23/60* (2023.01)
  *H04N 23/61* (2023.01)
  *H04N 23/667* (2023.01)

(52) U.S. Cl.
  CPC ............ *H04N 23/61* (2023.01); *H04N 23/64* (2023.01); *H04N 23/667* (2023.01)

(56) References Cited

U.S. PATENT DOCUMENTS

| | | | |
|---|---|---|---|
| 2015/0317508 A1* | 11/2015 | Zheng | G02B 21/241 |
| | | | 348/80 |
| 2016/0266366 A1* | 9/2016 | Chung | G02B 21/008 |
| 2017/0371141 A1 | 12/2017 | Besley | |
| 2019/0049712 A1* | 2/2019 | Kim | G02B 21/16 |
| 2021/0112187 A1* | 4/2021 | Chen | G02B 21/367 |

FOREIGN PATENT DOCUMENTS

| | | | | |
|---|---|---|---|---|
| CN | 107065159 A | | 8/2017 | |
| CN | 107209123 A | * | 9/2017 | ......... G01N 21/6452 |
| WO | WO-2017172819 A1 | * | 10/2017 | ......... G01B 11/2545 |
| WO | 2018/171381 A1 | | 9/2018 | |

OTHER PUBLICATIONS

Guoan Zheng, et al., "Wide-field, high-resolution Fourier ptychographic microscopy", Nature Photonics, Sep. 2013, vol. 7, pp. 739-745 (8 pages total).

An Pan, et al., "Linear space-variant optical cryptosystem for Fourier ptychography", Proc. of SPIE, 2019, vol. 10887, pp. 108872C-1-108872C-8 (8 pages total).

Chao Zuo, et al., "Wide-field high-resolution 3D microscopy with Fourier ptychographic diffraction tomography", arXiv:1904.09386v1 [physics.optics], Apr. 20, 2019, pp. 1-35 (35 pages total).

Ao Zhou, et al., "Analysis of Fourier ptychographic microscopy with half of the captured images", Journal of Optics, Jul. 31, 2018, pp. 1-7, vol. 20, No. 095701.

International Search Report for PCT/KR2021/005567 dated Aug. 11, 2021 [PCT/ISA/210].

* cited by examiner (a)

(b)

METHOD AND DEVICE FOR ACQUIRING IMAGE BY USING LIGHT-EMITTING ELEMENT ARRAY

CROSS-REFERENCE TO RELATED APPLICATION

This application is a National Stage Entry of PCT International Application No. PCT/KR2021/005567, which was filed on May 3, 2021, and which claims priority to Korean Patent Application No. 10-2020-0053223, filed on May 4, 2020 in the Korean Intellectual Property Office, the disclosure of which is incorporated herein by reference.

TECHNICAL FIELD

The technical field relates to a method of acquiring an image and an apparatus therefor, and more particularly to a method of acquiring an image using a light-emitting element array in which a plurality of light-emitting elements are aligned, and an apparatus therefor. For example, the method of acquiring an image and the apparatus therefor may be applied to a microscope system that irradiates light to an object such as a sample through a light source and acquires an enlarged image of the object.

BACKGROUND ART

A microscope system forms a magnified image by irradiating light to an object such as a sample through a light source and passing light reflected from the sample through a lens. In this case, the enlarged image may be photographed through an image sensor, and the enlarged image of the sample may be acquired.

Meanwhile, an image of an object may be acquired through a digital holography imaging system that measures three-dimensional complex image information (complex amplitude) and uses the three-dimensional complex image information.

The traditional digital holography technology has several problems such as an increase in the number of components due to the complexity of the optical system structure, an increase in the cost of configuring the optical system, and the like.

For example, Fourier Ptychographic Microscopy (FPM), as a three-dimensional measurement method based on an optical element array, is a technology that can reconstruct a high magnification or high-resolution image using a low-magnification or low-resolution lens or image, but has a problem in that the amount of computation and time required for image processing increases.

DISCLOSURE

Technical Problem

Therefore, the present invention has been made in view of the above problems, and it is one object of the present invention to provide an image processing method and apparatus capable of significantly reducing the amount of computation and processing speed compared to a general FPMP while using an existing Fourier Ptychographic Microscopy Process (FPMP).

It is another object of the present invention to provide an enhanced FPMP and, through AFPMP according to an embodiment of the present invention, to reduce the amount of computation and image storage capacity and to improve image quality.

Technical Solution

In accordance with an aspect of the present invention, the above and other objects can be accomplished by the provision of a method of acquiring an image using a light-emitting element array, the method including: acquiring N×M source images of a sample using a light source of each of N×M (N and M are integers of 3 or more) light-emitting elements arranged in a matrix structure; selecting n×m (n is an integer less than N and m is an integer less than M) images among the source images based on a central image using a central light-emitting element, located at a center of the matrix structure, as a light source, performing a Fourier Ptychographic Microscopy Process (FPMP) on the n×m images, and reconstructing a low-resolution, large-area image; detecting a partial region containing a detection target object from the low-resolution, large-area image, and acquiring partial-region images matching the partial region from each of the source images; and performing FPMP on the partial-region images and reconstructing a high-resolution image on the partial region.

The acquiring of the acquiring of the source images may include: confirming resolution required depending upon a type of the object; and determining the N and M based on the resolution.

The reconstructing of the low-resolution, large-area image may include: determining overlapping images, in which a dark field (DF) and a bright field (BF) exist in a preset ratio, among the n×m images; and performing FPMP on remaining images except for the overlapping images among the n×m images.

The reconstructing of the high-resolution image on the partial region may include: determining overlapping images, in which a dark field (DF) and a bright field (BF) exist in a preset ratio, among the N×M source images; acquiring partial-region images from the remaining images except for the overlapping images among the N×M source images; and performing FPMP on partial-region images acquired from the remaining images except for the overlapping images.

The determining of the overlapping images may include: confirming an image group corresponding to an index (2k+1, 2k+1) assigned to an outer row and column image group from the central image based on an index (1,1) assigned to the central image; confirming a DF and BF ratio of each image belonging to the image group corresponding to the (2k+1, 2k+1); and deleting the image group corresponding to the (2k+1, 2k+1) from the source images when the number of images having DF and BF in the preset ratio among images belonging to the image group is two or more, wherein the source images are distinguished by indexes matching respective positions of N×M light-emitting elements arranged in a matrix form, an index assigned to the central image is (1,1), and an index assigned to an image group using light-emitting elements, arranged outside by k rows or k columns from the central light-emitting element, as a light source is (2k+1, 2k+1), where k=1,2,3 ... (M−1)/2, and an image group corresponding to the (2k+1, 2k+1) is composed of $\{(2k+1)\times(2k+1)\}-\{(2k-1)\times(2k-1)\}$ images.

In accordance with another aspect of the present invention, there is provided a method of acquiring an image using a light-emitting element array, the method including: acquiring a plurality of source images by sequentially irradiating a sample with a plurality of light-emitting element light sources arranged in a light-emitting element array; selecting some images from among the plural source images; reconstructing a first image from the some images using a Fourier Ptychographic Microscopy Process (FPMP); detecting a partial region containing a detection target object from the first image; acquiring partial-region images corresponding to the partial region from each of the source images; and reconstructing a second image from the partial-region images using the FPMP.

The reconstructing of the first image may include: determining overlapping images, in which a dark field (DF) and a bright field (BF) exist in a preset ratio, from among the some images; and performing FPMP on remaining images except for the overlapping images among the some images.

The reconstructing of the second image may include: determining overlapping images, in which a dark field (DF) and a bright field (BF) exist in a preset ratio, among the source images; acquiring partial-region images from the remaining images except for the overlapping images among the source images; and performing FPMP on partial-region images acquired from the remaining images except for the overlapping images.

In accordance with another aspect of the present invention, there is provided a method of acquiring an image using a light-emitting element array, the method including: acquiring a plurality of source images by sequentially irradiating a sample with a plurality of light-emitting element light sources; determining overlapping images, in which a dark field and a bright field exist in a preset ratio, among the plural source images; and applying a Fourier Ptychographic Microscopy Process (FPMP) to remaining images except for the overlapping images among the plural source images and generating a reconstructed image.

In accordance with another aspect of the present invention, there is provided an apparatus for acquiring an image, including: an image acquirer configured to acquire N×M source images photographed using a light source of each of a plurality of light-emitting elements arranged in a light-emitting element array; a storage configured to store the source images; and a controller, wherein the controller includes at least one processor, wherein the processor is configured to select n×m (n is an integer less than N and m is an integer less than M) images from among the source images based on a central image using a central light-emitting element, located at a center of the light-emitting element array, as a light source, to reconstruct a low-resolution, large-area image from the n×m images using a Fourier Ptychographic Microscopy Process (FPMP), to detect a partial region containing a detection target object from the low-resolution, large-area image, to acquire partial-region images matching the partial region from each of the source images; and to reconstruct a high-resolution image on the partial region using the FPMP.

In accordance with another aspect of the present invention, there is provided an apparatus for acquiring an image, including: an image acquirer configured to acquire a plurality of source images photographed using a light source of each of a plurality of light-emitting elements arranged in a light-emitting element array; a storage configured to store the source images; and a controller, wherein the controller includes at least one processor, wherein the processor is configured to select some images from among the plural source images, located at a center of the light-emitting element array, as a light source, to reconstruct a first image from the some mages using a Fourier Ptychographic Microscopy Process (FPMP), to detect a partial region containing a detection target object from the first image, to acquire partial-region images corresponding to the partial region from each of the source images; and to reconstruct a second image from the partial region images using the FPMP.

In accordance with yet another aspect of the present invention, there is provided an apparatus for acquiring an image, including: an image acquirer configured to acquire a plurality of source images photographed using a light source of each of a plurality of light-emitting elements arranged in a light-emitting element array; a storage configured to store the source images; and a controller, wherein the controller comprises at least one processor, wherein the processor is configured to determine overlapping images, in which a dark field and a bright field exist in a preset ratio, from among the plural source images, to apply a Fourier Ptychographic Microscopy Process (FPMP) to remaining images except for overlapping images among the plural source images, and to generate a reconstructed image.

Advantageous Effects

In accordance with embodiments of the present invention, the amount of computation and processing speed can be significantly reduced compared to a general FPMP even using an existing Fourier Ptychographic Microscopy Process (FPMP).

In accordance with embodiments of the present invention, a desired image for a sample can be acquired with only a low magnification lens.

An enhanced FPMP can be proved and, through AFPMP according to an embodiment of the present invention, the amount of computation and image storage capacity can be reduced and image quality can be improved.

BEST MODE

Figure 1:
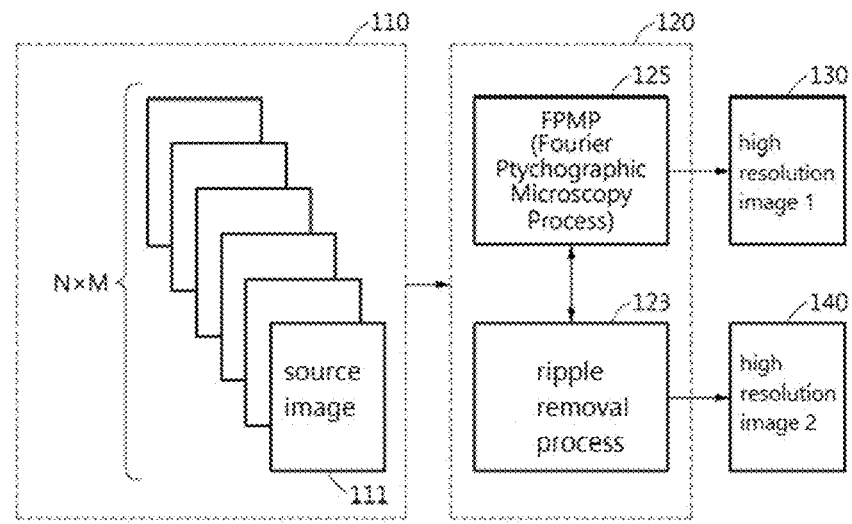
FIG. 1 is a diagram for explaining the principle of image acquisition according to an embodiment of the present invention.

The present invention will now be described more fully with reference to the accompanying drawings and contents disclosed in the drawings. However, the present invention should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or." That is, unless otherwise mentioned or clearly inferred from context, the expression "x uses a or b" means any one of natural inclusive permutations.

In addition, as used in the description of the invention and the appended claims, the singular forms "a", "an" and "the" are intended to include the plural forms as well, unless context clearly indicates otherwise In addition, terms such as "first" and "second" are used in this specification and the accompanying claims merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

FIG. 1 is a diagram for explaining the principle of image acquisition according to an embodiment of the present invention.

Referring to FIG. 1, the present invention includes a first process 110 of acquiring source images 111 of a sample or an object and a second process 120 of performing image processing on the source images.

Figure 3:
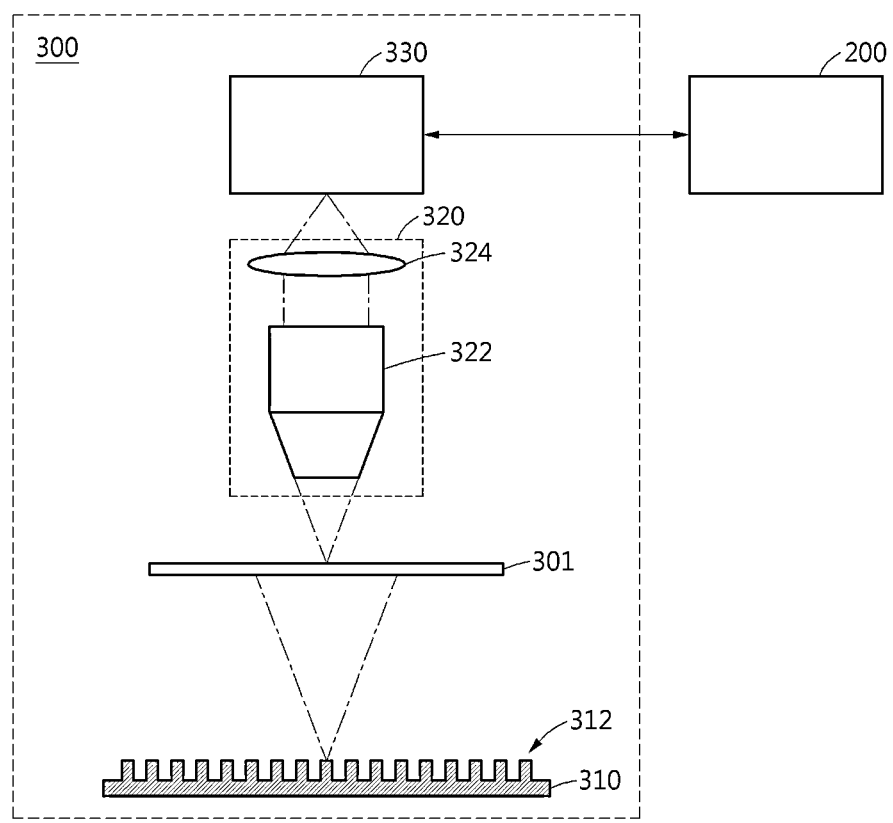
FIG. 3 is a diagram for explaining an application example and source image acquirement of the present invention.

The first process 110 for acquiring the source images 111 may be performed by, for example, an optical system 300 shown in FIG. 3. Here, when the optical system 300 includes a light-emitting element array, for example, an LED array, the number of the source images 111 may be the same as the number of light-emitting elements included in the light-emitting element array.

When the light-emitting elements are arranged on the light-emitting element array in a matrix form, the matrix form consists of N rows and M columns. Accordingly, the number of the source images 111 may be N×M. Here, N and M may be integers of 3 or more and may be the same number or different numbers.

Hereinafter, for convenience of description, the case where N and M are the same number will be mainly described as an example. In other words, the light-emitting element array may include a plurality of light-emitting elements arranged in a matrix structure such as 3×3, 5×5, 7×7, 9×9, 11×11, 13×13, or 15×15.

The light-emitting elements arranged in the light-emitting element array may be arranged in various forms as needed as well as a matrix structure. However, for convenience of explanation, a light-emitting element array in which light-emitting elements are arranged in a matrix structure will be mainly described in the present specification.

Figure 2:
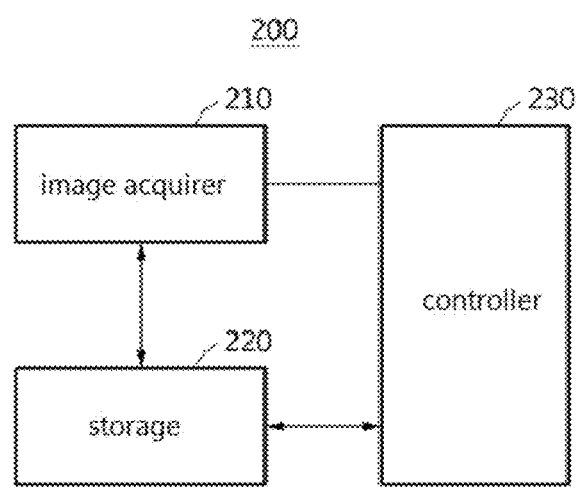
FIG. 2 is a diagram for explaining the configuration of an image acquirement apparatus according to an embodiment.

The second process 120 may be carried out by the apparatus shown in FIG. 2.

The second process 120 includes an FPMP 125 and a ripple removal process 123. In addition, although not shown in FIG. 1, the second process 120 may further perform processes shown in FIGS. 8 to 11.

Through the second process 120, a high-resolution image 130 or 140 may be generated from a low-resolution or low-magnification image.

Hereinafter, the second process 120 and an apparatus for performing the second process 120 and a method thereof are described in detail with reference to FIGS. 2 to 19.

FIG. 2 is a diagram for explaining the configuration of an image acquirement apparatus according to an embodiment.

Referring to FIG. 2, an image acquirement apparatus 200 includes an image acquirer 210, a storage 220, and a controller 230.

The image acquirer 210 acquires N×M source images photographed using a light source of each of a plurality of light-emitting elements arranged in the light-emitting element array.

For example, when the plural light-emitting elements are arranged in a 3×3 form, or when only 9 light-emitting elements are used based on the light-emitting elements located at the center of the light-emitting element array, 9 source images may be acquired.

The storage 220 stores source images.

The controller 230 may include at least one processor. Here, the controller 740 may be connected to at least one computer-readable storage in which instructions or programs are recorded.

The controller 230 includes at least one processor configured to select some images from among a plurality of source images, to reconstruct a first image from among the some images using Fourier Ptychographic Microscopy Process (FPMP), to detect a partial region including a detection target object from the first image, to acquire partial-region images corresponding to the partial region from each of the source images, and to reconstruct a second image from the partial-region images using FPMP.

Here, the some images selected from among the plural source images may be n×m (n is an integer less than N and m is an integer less than M) images. Here, n×m images may be selected based on a central image using a central light-emitting element, located in the center of the light-emitting element array, as a light source.

Figure 6:
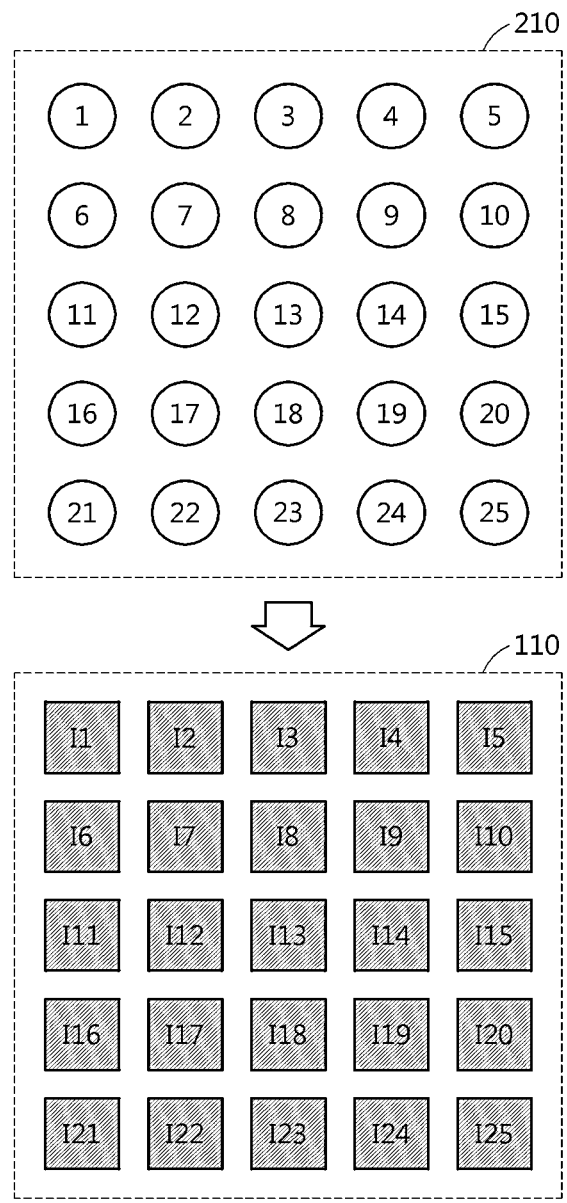
FIG. 6 is a diagram for explaining an indexing relationship between an optical element arrangement and a source image according to an embodiment.

Here, "a central image using a central light-emitting element, located in the center of the light-emitting element array" may be, for example, an image photographed using a central light-emitting element "13" of a light-emitting element array 210 of FIG. 6 as a light source. Referring to FIG. 6, an image photographed using the central light-emitting element "13" as a light source is an image marked with "I13" among the source images 110. The relationship between a light-emitting element used as a light source and an image is described in detail with reference to FIGS. 6 and 7.

For example, N and M may be any one of 7, 9, 11, 13 and 15, n and m may be 3 or 5.

Here, the first image may be a low-resolution, large-area image.

Here, the second image reconstructed from partial-region images may be a high-resolution image of the partial region.

Accordingly, the controller 230 may select n×m (n is an integer less than N and m is an integer less than M) images from among the source images based on the central image using the central light-emitting element, located at the center of the light-emitting element array, as a light source and may reconstruct a low-resolution, large-area image from the n×m images using FPMP.

In addition, the controller 230 may include at least one processor configured to detect a partial region including a detection target object from a low-resolution, large-area image, to acquire partial-region images matching the partial region from each of the source images, and to reconstruct a high-resolution image for the partial region using FPMP.

In addition, the controller 230 may include at least one processor configured to determine overlapping images, in which a dark field and a bright field are present in a preset ratio, from among the plural source images, to apply FPMP to the remaining images, except for the overlapping images, of the plural source images, and to generate a reconstructed image.

The ripple removal process 123 shown in FIG. 1 includes performing FPMP on the remaining images except for overlapping images.

Figure 16:
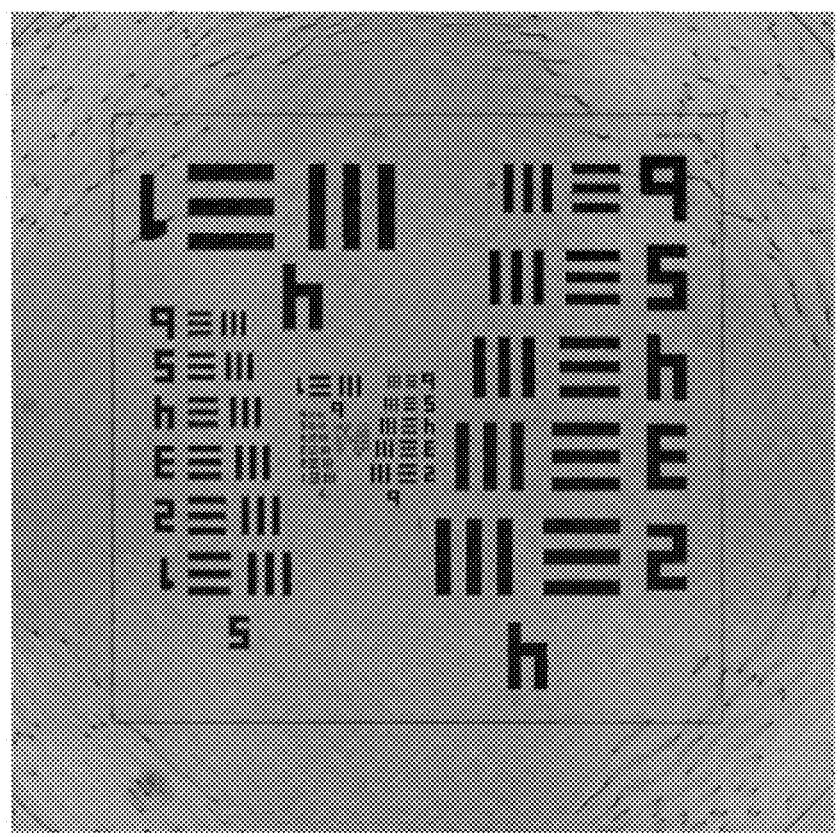
FIG. 16 shows an example of an image reconstructed through general FPMP.
Figure 17:
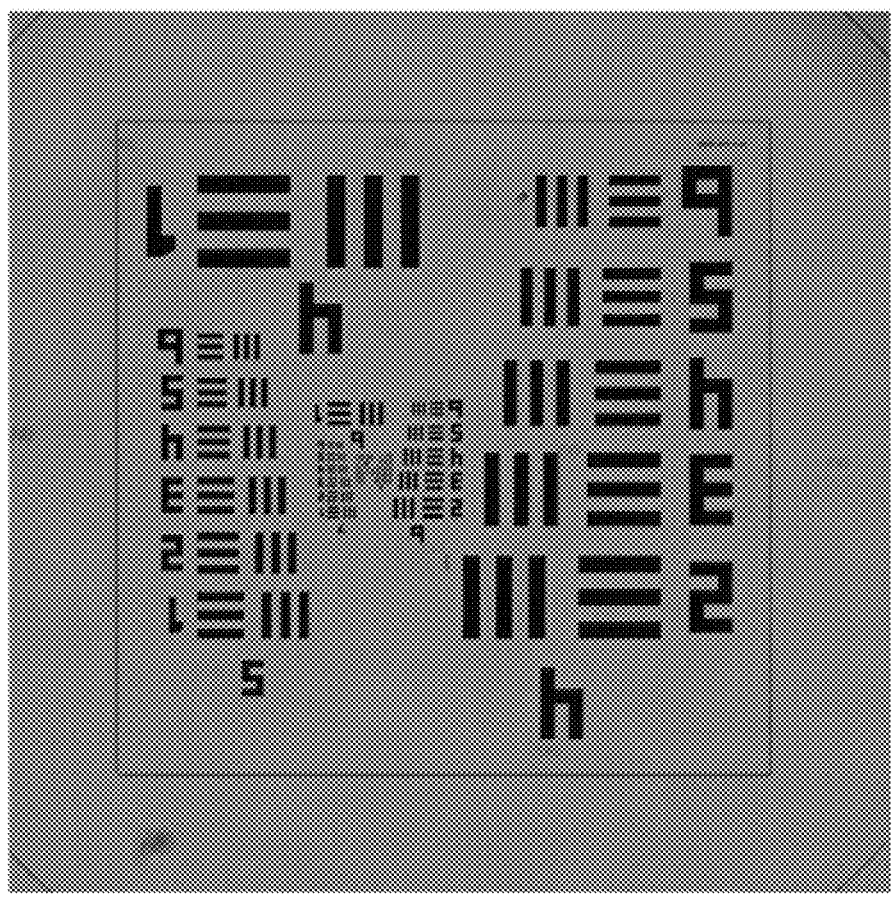
FIG. 17 shows an example of an image reconstructed through APFMP according to an embodiment.

An image reconstructed through conventional FPMP may include ripples in an outer region thereof as shown in FIG. 16. However, through the ripple removal process 123 according to an embodiment of the present invention, an image from which ripples are removed may be acquired as shown in FIG. 17.

For example, the image acquirement apparatus 200 may apply FPMP to 3×3 images to reconstruct a low-resolution, large-area image, may select a partial region containing an object from the low-resolution, large-area image, and, after separating partial-region images, which correspond to the partial region, from all source images, may perform FPMP on the partial-region images.

For example, a target sample of the source image may be a blood image, and the object may be a feature point, such as white blood cells, which can be identified in the image.

In the case of a traditional microscope system, an object is detected after taking a sample with a low-magnification lens, and the object is observed again using a high-magnification lens. However, according to an embodiment of the present invention, a high-resolution image of an object may be reconstructed through image processing of source images photographed with a low-magnification lens. When the image acquirement apparatus according to an embodiment of the present invention is applied to a microscope system, there is an advantage in that the system may be configured with only a low-magnification lens.

FIG. 3 is a diagram for explaining an application example and source image acquisition of the present invention.

Referring to FIG. 3, the image acquirement apparatus 200 according to an embodiment of the present invention may acquire source images photographed by the optical system 300.

For example, the optical system 300 may be a microscope system.

The optical system 300 includes a light source part 310, a sample plate 301 capable of positioning a sample, an optical part 320, and an image sensor 330.

The light source part 310 may include a light-emitting diode array (LED array) including a plurality of light-emitting elements 312 arranged in at least one or more columns. Each of the plural light-emitting elements 312 may emit light in a different color or the same color. In the light source part 310, each of the plural light-emitting elements 312 may simultaneously or sequentially emit light to radiate light to the sample plate 301 disposed in parallel with the light source part 310.

The optical part 320 may include a first lens 322 and a second lens 324.

The optical part 320 may form an enlarged image of a sample by light irradiated from the light source part 310 to the sample and may provide the formed image to the image sensor 330.

The first lens 322 is a lens configured to project an enlarged image of a sample formed by light irradiated to the sample and may be an objective lens.

The second lens 324 is a lens configured to transmit an enlarged image projected through the first lens 322 to the image sensor 330 and may be a tube lens.

The respective optical axes of the first lens 322 and the second lens 324 may coincide with each other.

The image sensor 330 may generate at least one image by capturing an image of a sample which has passed through the optical part 320. For example, the image sensor 330 may include a Charge-Coupled Device (CCD) sensor, a Complementary Metal Oxide Semiconductor (CMOS) sensor, or the like.

Figure 4:
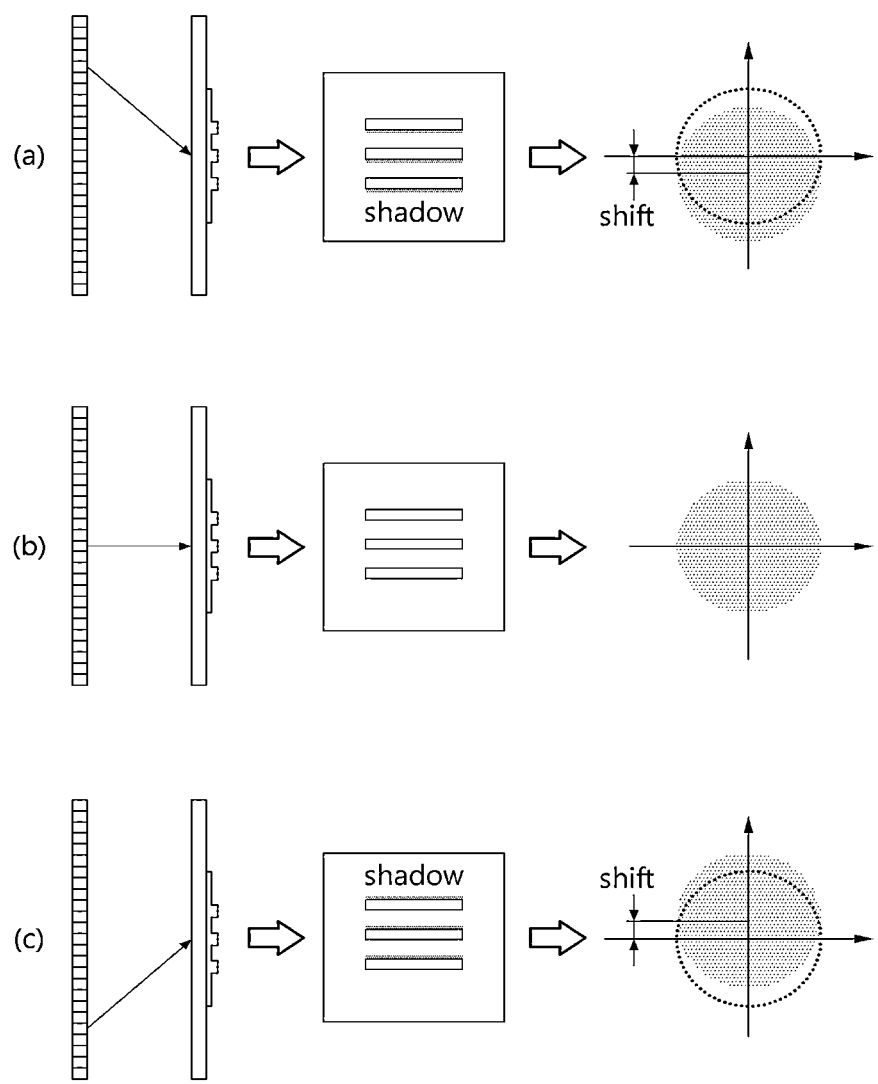
FIG. 4 is a diagram for explaining a Fourier ptychographic microscopy technique.

FIG. 4 is a diagram for explaining a Fourier ptychographic microscopy technique.

When light is irradiated to a target object at an inclined angle as in FIG. 4(A) using the optical system shown in FIG. 3, the image sensor 330 acquires an image in the form of a shadow depending on a direction in which the light is irradiated. In addition, when light is vertically irradiated to the target object as in FIG. 4(B), the image sensor 330 acquires an image in the form of almost no shadow. In addition, when light is irradiated to the target object at an inclined angle opposite to FIG. 4(A) as shown in FIG. 4(C), the image sensor 330 may acquire an image in the form of a shadow at a location different from the image acquired in FIG. 4(A).

For example, when using FIG. 2(B) (when there are few shadows) as a reference area, the shadowed area in FIG. 4(A) or 4(C) appears as a partially shifted area compared to the reference area as shown in the drawings. In a process of synthesizing various image information converted to a spatial frequency plane as described above, there is an advantage in that a resolution is primarily increased.

In addition, phase information may be calculated from excess information in the overlapping region during the image reconstruction process, and 3D information may be acquired using this.

When the FPM technology is used, a low-cost light source may be used compared to a general digital holography technology, and an optical system having a simple structure may be configured, thereby reducing equipment cost and reducing the volume of the optical system.

However, since the amount of computation required for restoration may increase as the number of source images used in FPMP increases, a method for reducing the amount of computation may be required.

In addition, since an image reconstructed through FPMP may include ripples, a method for solving the ripple issue may be required.

Figure 5:
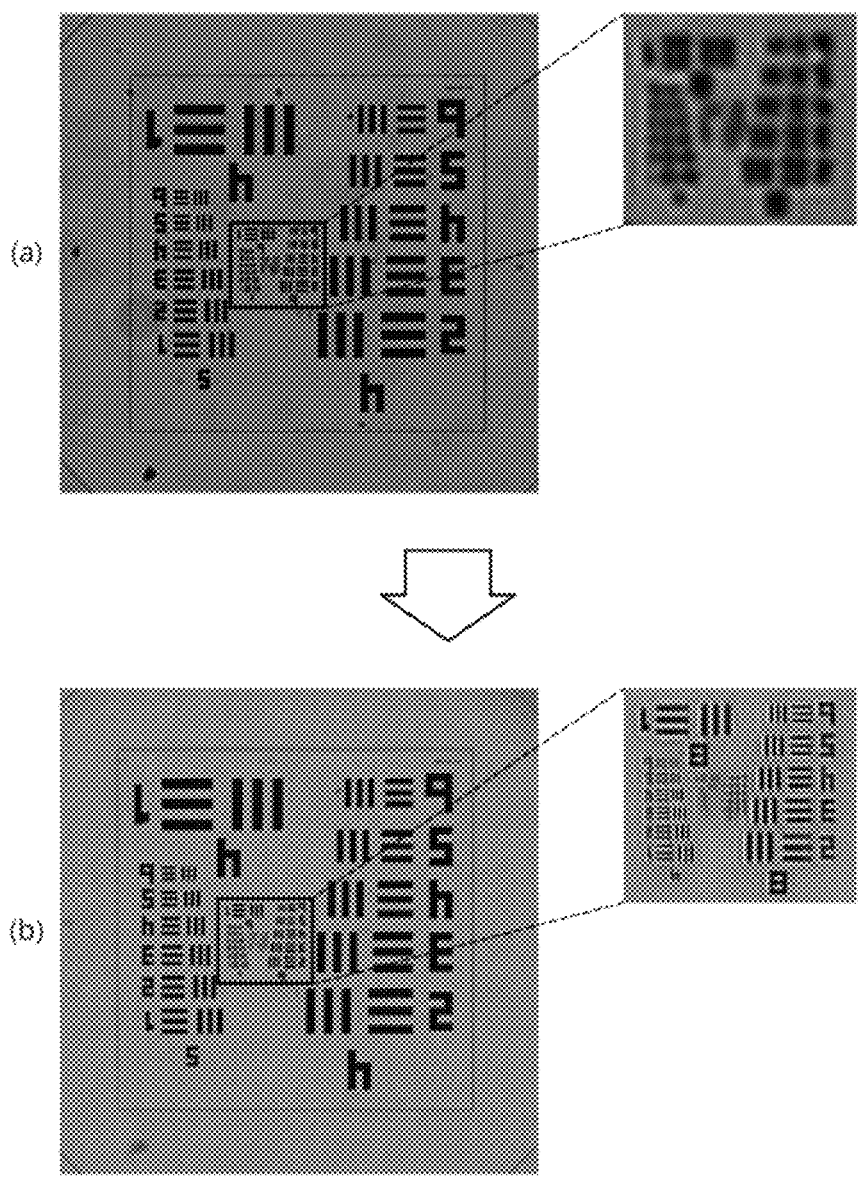
FIG. 5 illustrates an example of an image generated through a Fourier ptychographic microscopy technique.

FIG. 5 illustrates an example of an image generated through a Fourier ptychographic microscopy technique.

FIG. 5(A) illustrates an example of source images, and FIG. 5 (B) illustrates images reconstructed using the source images.

Referring to FIGS. 5(A) and (B), for example, it can be seen that the center of the reconstructed images is reconstructed with high resolution, compared to the center of the source images.

FIG. 6 is a diagram for explaining an indexing relationship between an optical element arrangement and a source image according to an embodiment.

Referring to FIG. 6, the optical system 300 or the image acquirement apparatus 200 may assign an index to each of the source images 110 to match the position of each of the light-emitting elements arranged in the light-emitting element array 210.

In the example shown in FIG. 6, a No. 13 light-emitting element 13 located at the center of the light-emitting element array 210 may be a central light-emitting element located on the central axis of the optical part 320.

The image I13 is an image photographed in a state in which the No. 13 light-emitting element is turned on and the other light-emitting elements are turned off. Similarly, an image I1 is an image photographed in a state in which only a No. 1 light-emitting element is turned on, and an image I25 is an image photographed in a state in which only a 25th light-emitting element is turned on.

Accordingly, unlike the embodiment shown in FIG. 6, a total of 49 (7×7) source images may be acquired when a 7×7 light-emitting element array is used.

In the present specification, an image using a light-emitting element, such as the No. 13 light-emitting element, located at the center of the light-emitting element array as a light source is referred to as "a central image." Accordingly, "a central image" in FIG. 6 provided as an embodiment is the image I13.

An identifier or index for each source image may be linearly given as shown in FIG. 6. In addition, considering the No. 13 light-emitting element as a (3, 3) component of the matrix, an index for the image I13 may be expressed as I(3,3).

In addition, an index representing a group of images for use in the ripple removal process 123 according to an embodiment of the present invention is also possible.

For example, in the example shown in FIG. 6, an index (3, 3) indicating an image group may be used when an index of (1, 1) is assigned to the image I13 that is a central image.

Here, the image group corresponding to the index (3, 3) refers to images photographed using each of light-emitting elements corresponding to a "3×3 light-emitting elements matrix" as a light source.

In the embodiment shown in FIG. 6, the 3×3 light-emitting element matrix means is Nos. 7, 8. 9, 12, 14, 17, 18, and 19 light-emitting elements except for the No. 13 light-emitting element that is a central light-emitting element.

Similarly, a 5×5 light-emitting element matrix means the case wherein light-emitting elements, arranged outside by 2 rows and 2 columns from the No. 13 light-emitting element as a central light-emitting element, are used as a light source.

Accordingly, in the embodiment shown in FIG. 6, images included in the image group corresponding to the image group index (3, 3) are I7, I8. I9, I12, I14, I17, I18, and I19.

In addition, in the embodiment shown in FIG. 6, images included in the image group index (5, 5) are I1, I2, I3, I4, I5, I6, I10, I11, I15, I16, I20, I21, I22, I23, I24, and I25.

The image group index will be further described with reference to FIG. 7.

Figure 7:
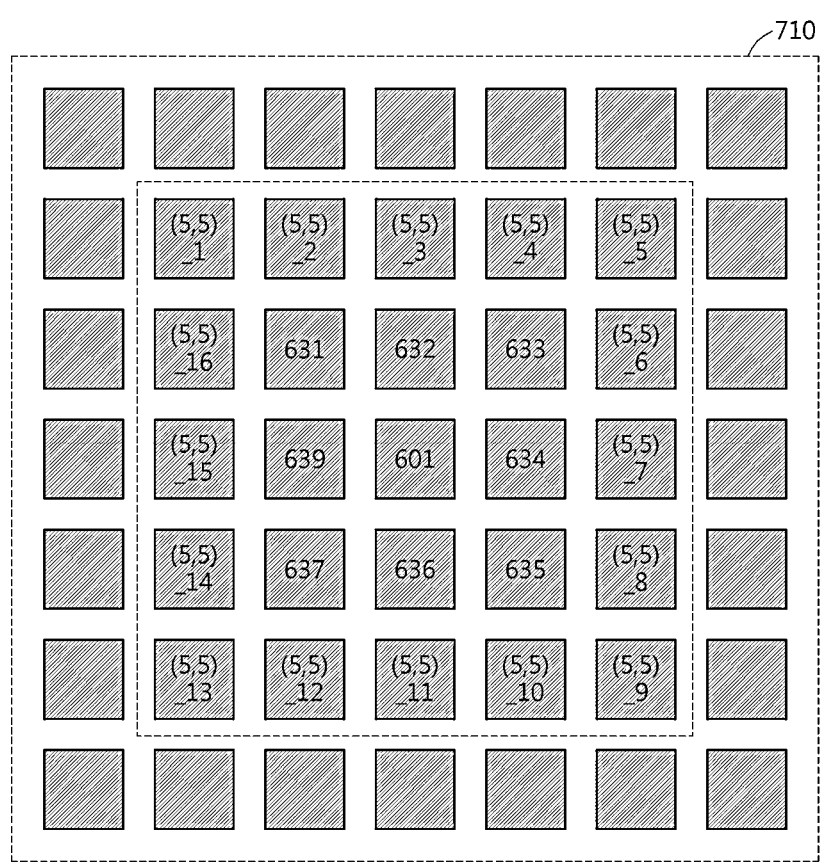
FIG. 7 is a diagram for explaining an indexing manner of source images according to an embodiment.

FIG. 7 is a diagram for explaining an indexing manner of source images according to an embodiment.

Squares shown in FIG. 7 represent source images matched to arrangement positions of light-emitting elements, respectively.

An embodiment shown in FIG. 7 may be a case wherein the light source part 310 of FIG. 3 is composed of 49 light-emitting elements arranged in 7×7.

In addition, the embodiment shown in FIG. 7 may be a case wherein 7×7 light-emitting elements, based on the central light-emitting element, among 225 light-emitting elements arranged in 15×15 in the light source part 310 of FIG. 3 are used.

Here, the number of source images may be determined according to performance (e.g., resolution, resolution) of an image to be used for final reading. For example, when a required resolution of a finally acquired image is 1.5 μm, 49 or 81 source images may be acquired using 7×7 or 9×9 light-emitting elements.

When generating a low-resolution, large-area image of a sample, 9 source images 601, 631, 632, 633, 634, 635, 636, 637, 639, and 631, which include a central image 601, matching 3×3 light-emitting elements, may be used.

That is, n×m (n is an integer less than N and m is an integer less than M) images selected to reconstruct a low-resolution, large-area image from the plural source images may be 9 source images 601, 631, 632, 633, 634, 635, 636, 637, 639, and 631.

Meanwhile, in the present specification, "overlapping images" means images in which a dark field and a bright field exist at a preset ratio.

"Overlapping images" may be determined individually or assigned as a group.

When "overlapping images" is designated as a group, they may be images belonging to an image group index (2k+1, 2k+1).

In FIG. 7, images corresponding to an image group index (5, 5) are (5, 5)_1 to (5, 5)_16 and are a total of 16 images.

In addition, images belonging to an image group index (7, 7) are 24 images denoted by reference numeral 710.

In summary, source images may be distinguished by indexes matching the respective positions of N×M light-emitting elements arranged in the matrix form. In addition, an index assigned to a central image may be (1,1), and an index assigned to an image group using light-emitting elements, arranged outside by k rows or k columns from the central light-emitting element, as a light source may be (2k+1, 2k+1), where k=1,2,3 . . . (M−1)/2, and an image group corresponding to the (2k+1, 2k+1) is composed of {(2k+1)×(2k+1)}−{(2k−1)×(2k−1))} images.

Figure 8:
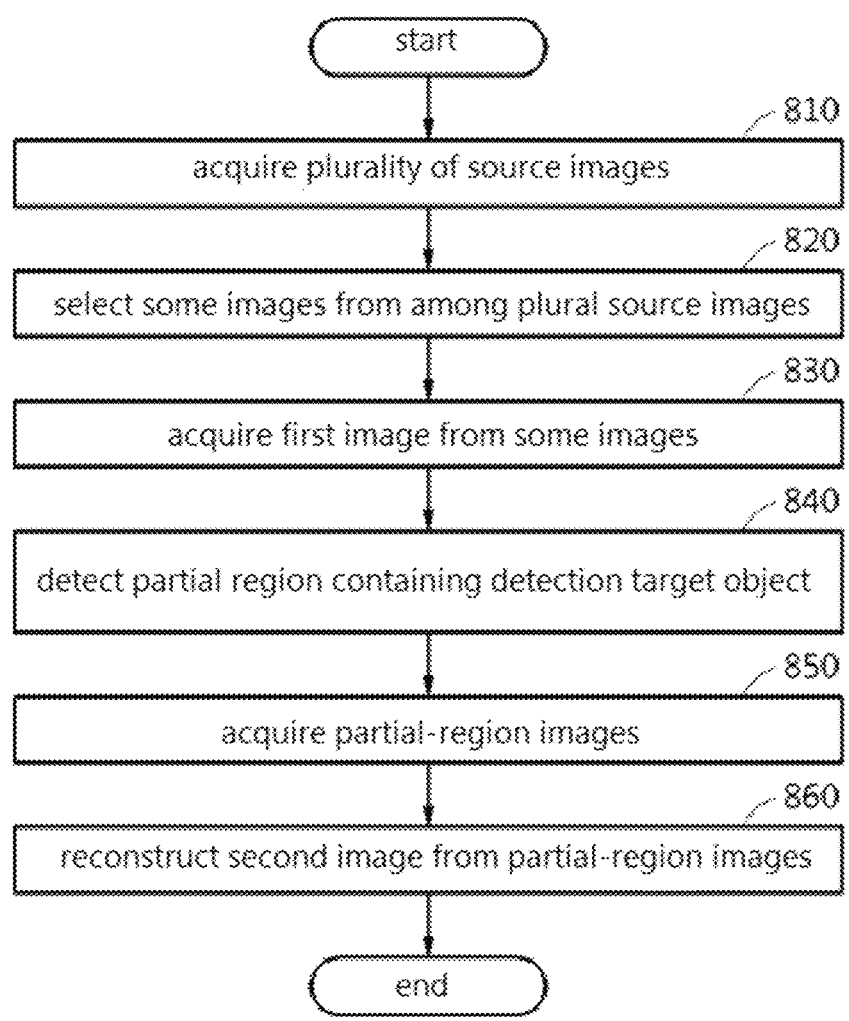
FIG. 8 is a flowchart for explaining a method of acquiring an image according to an embodiment.

FIG. 8 is a flowchart for explaining a method of acquiring an image according to an embodiment.

The method shown in FIG. 8 may be performed through the optical system 300 and the image acquirement apparatus 200 of FIG. 3. More specifically, steps 820 to 860 in FIG. 8, steps 920 to 930 in FIG. 9, steps 1031 to 1307 in FIG. 10 and steps 1131 to 1135 in FIG. 11 may be performed by the controller 230 in FIG. 2. However, for convenience of explanation, the performing subject in FIGS. 8 to 11 is referred to as "apparatus."

Referring to FIG. 8, in step 810, the apparatus acquires a plurality of source images by sequentially irradiating a sample with a plurality of light-emitting element light sources arranged in the light-emitting element array.

Figure 12:
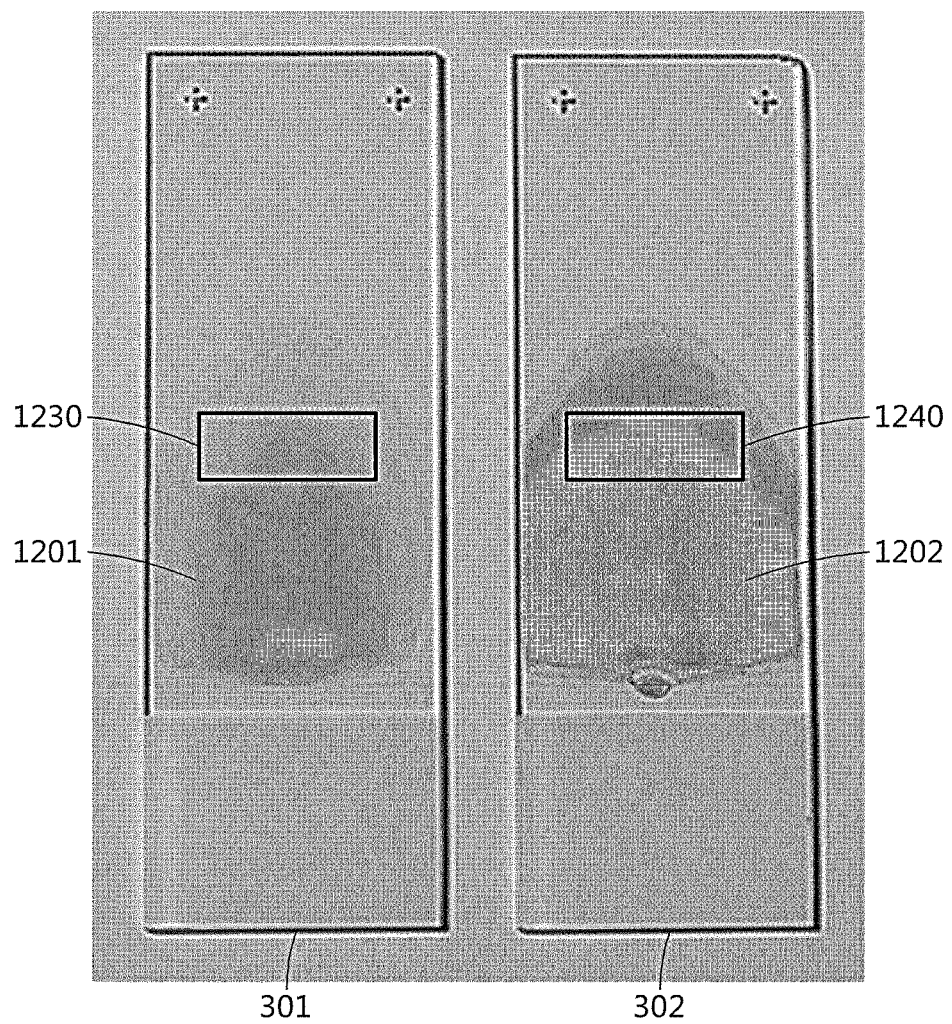
FIG. 12 is a diagram illustrating an example of the sample and sample plant in FIG. 3.

A sample may be placed on the sample plate 301, and the apparatus may determine a measurement position of the sample. Here, the measurement position of the sample may be a part marked with reference numeral 1230 or 1240 determined through a positioning algorithm as shown in FIG. 12.

After determining the measurement position, the optical system 300 may perform a procedure for adjusting a lens focus of the image sensor 330 or the optical part 320.

In step 810, the apparatus may determine the number of light-emitting elements to be used as a light source according to a required resolution, etc., for example, N×M light-emitting elements arranged in a matrix structure (N and M are integers of 3 or more) may be used.

Accordingly, in step 810, the apparatus may determine the measurement position of the sample, and may acquire N×M source images of the sample using a light source of each of N×M (N and M are integers of 3 or more) light-emitting elements arranged in a matrix structure.

In addition, in step 810, the apparatus may confirm a resolution required depending upon the type of an object, and may determine the N and M based on the resolution.

In step 820, the apparatus selects some images from among the plural source images.

Here, "some images" may be n×m (n is an integer less than N and m is an integer less than M) images among the source images based on a central image using a central light-emitting element, located at the center of the matrix structure, as a light source.

For example, "some images" may be 9 images I7 to I9, I12 to I13, and I17 to I19 matching the 3×3 light-emitting element matrix in FIG. 6.

In step 830, the apparatus reconstructs a first image from secondary images using FPMP.

Here, the first image may be a low-resolution, large-area image.

Accordingly, through steps 820 to 830, the apparatus may select n×m (n is an integer less than N and m is an integer less than M) images from the source images and may perform FPMP on the n×m images to reconstruct a low-resolution, large-area image.

In step 830, the apparatus may determine overlapping images, in which a dark field (DF) and a bright field (BF) exist with a preset ratio, among some images, and may perform FPMP on remaining images, except for the overlapping images, among the some images.

Here, the "preset ratio" may be determined in a range of 50 to 90% DF and 10 to 50% BF. For example, an image with DF of 82% and BF of 18% may be determined as "overlapping image".

In step 840, the apparatus detects a partial region including a detection target object from the first image.

Here, the object may have feature points that can be distinguished with the naked eye on the magnification of the sample, and may exist at multiple positions in one low-resolution, large-area image. As the partial region, a plurality of regions or only one region may be selected. When a plurality of partial regions are selected, high-resolution image reconstruction may be performed for each of the partial regions. Selection of the partial region may be performed using a candidate group detection algorithm using data learned through machine learning or deep learning. Machine learning or deep learning for selection of the partial region may use known techniques. The machine learning or deep learning is out of the scope of the present invention, so a detailed description thereof is omitted.

In step 850, the apparatus acquires partial-region images corresponding to the partial region from the respective source images.

That is, unlike the process of generating a low-resolution, large-area image, partial-region images are acquired from the respective source images.

For example, when a 15×15 light-emitting element matrix is used, 225 source images are acquired, and even when a low-resolution, large-area image is reconstructed from 3×3 images, a partial region image may be composed of 225 source images acquired from all source images.

However, when the ripple removal process 123 is applied in the process of performing FPMP, the number of partial region images or the number of "some images" may be changed.

In step 860, the apparatus reconstructs a second image from the partial-region images using FPMP. Here, the second image may be a high-resolution image of the partial region.

A high-resolution image of the partial region may be displayed through a display (not shown) of the image acquirement apparatus 200 for reading by an expert, or may be transmitted to a separate server or terminal apparatus.

In steps 850 and 860, the apparatus may determine overlapping images, in which a dark field (DF) and bright field (BF) exist at a preset ratio, among the source images, may acquire partial-region images of remaining images, except for the overlapping images, among the source images, and may perform FPMP on the partial-region images acquired from the remaining images except for overlapping images.

Figure 9:
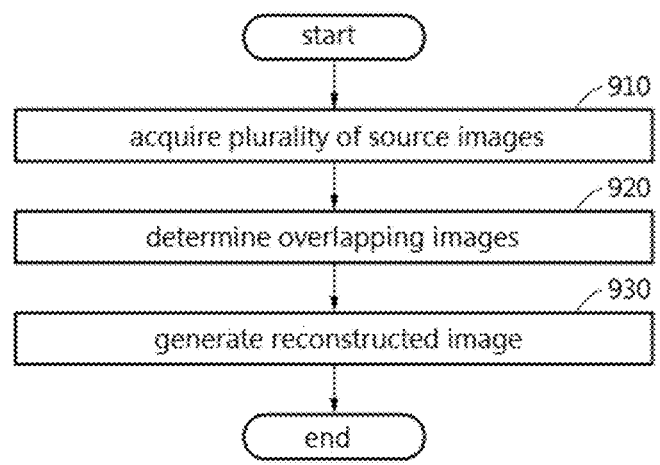
FIG. 9 is a flowchart for explaining a method of acquiring an image according to another embodiment.

FIG. 9 is a flowchart for explaining a method of acquiring an image according to another embodiment.

Referring to FIG. 9, in step 910, the apparatus acquires a plurality of source images by sequentially irradiating a sample with a plurality of light-emitting element light sources arranged in a matrix structure.

In step 920, the apparatus determines overlapping images, in which a dark field and a bright field exist in a preset ratio, among the plural source images.

In step 930, the apparatus applies FPMP to remaining images, except for the overlapping images, among the plural source images, and generates a reconstructed image.

For example, when overlapping images among the source images shown in FIG. 7 are (5, 5)_1, (5, 5)_2, (5, 5)_4, (5, 5)_5, (5, 5)_6, (5, 5)_8, (5, 5)_9, (5, 5)_10, (5, 5)_12, (5, 5)_13, (5, 5)_14, and (5, 5)_16, "remaining images" are (5, 5)_3, (5, 5)_7, (5, 5)_11, (5, 5)_15, 601, 631~639 and 24 images belonging to reference numeral 710. Accordingly, when there are 12 overlapping images, the number of remaining images is 37.

Here, indexing information for each of the "overlapping images" may be maintained and the image file may be removed from the storage 220 in FIG. 2. In this way, it is possible to reduce the storage capacity of source images to create a reconstructed image.

Accordingly, the storage space of the apparatus may be efficiently used through the ripple removal process 123 according to an embodiment of the present invention, and when transmitting stored data to the outside, a transmission capacity may be reduced.

Figure 10:
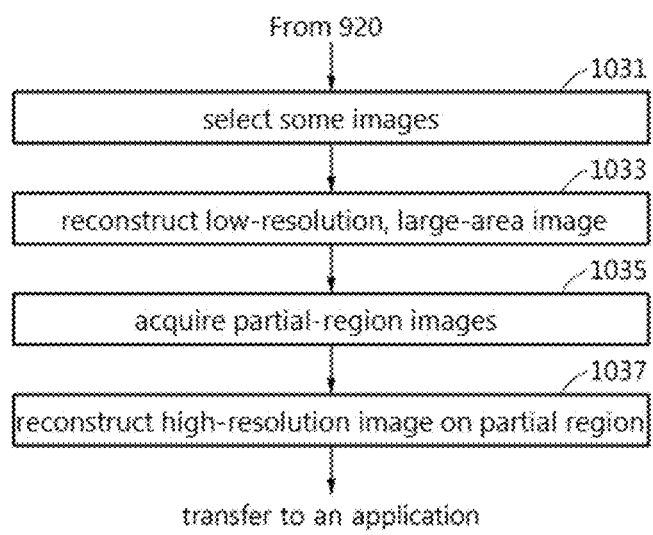
FIG. 10 is a flowchart for explaining an image reconstruction method according to an embodiment.
Figure 11:
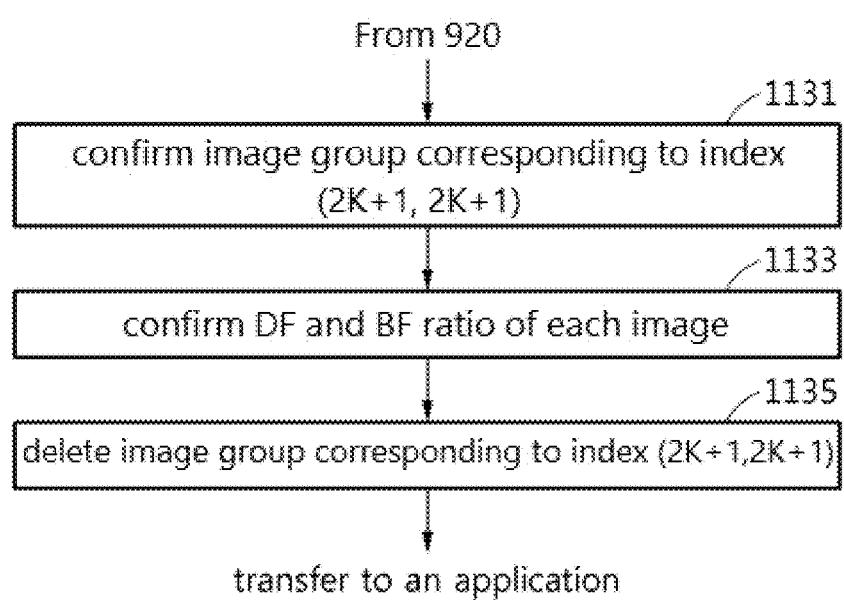
FIG. 11 is a flowchart for explaining a method of reconstructing an image from which ripples are removed according to an embodiment.

Step 930 of creating a reconstructed image may include the steps shown in FIG. 10 or the steps shown in FIG. 11.

FIG. 10 is a flowchart for explaining an image reconstruction method according to an embodiment.

Referring to FIG. 10, in step 1031, the apparatus selects some images from among the remaining images based on a central image using the central light-emitting element located at the center of the light-emitting element array as a light source.

In step 1033, the apparatus performs FPMP on some images and reconstructs a low-resolution, large-area image.

In step 1035, the apparatus detects a partial region including a detection target object from the low-resolution, large-area image, and acquires partial-region images matching the partial region from the respective remaining images.

In step 1037, the apparatus performs FPMP on the partial-region images and reconstructs a high-resolution image on the partial region.

The reconstructed image may be transferred from the apparatus to a running program or application.

FIG. 11 is a flowchart for explaining a method of reconstructing an image from which ripples are removed according to an embodiment.

Referring to FIG. 11, in step 1131, the apparatus confirms a central image using a central light-emitting element, located at the center of the matrix structure, as a light source, and checks an image group corresponding to an index (2k+1, 2k+1) assigned to an outer row and column image group from the central image based on an index (1,1) assigned to the central image.

For example, the central light-emitting element may be a No. 6 light-emitting element in FIG. 6.

For example, "k" may be "2", and images belonging to an image group (5, 5) may be 16 images indicated by (5, 5)_1 to (5, 5)_16 in FIG. 7.

In step 1133, the apparatus checks a DF and BF ratio of each image belonging to an image group corresponding to (2k+1, 2k+1).

In step 1135, when, among images belonging to an image group, there are two or more images in which DF and BF exist in a preset ratio, the apparatus may delete the image group corresponding to (2k+1, 2k+1) from the source images.

Steps 1131 to 1135 are included in a ripple removal process, and an execution result may be transferred to a currently running program or application.

If, among the images belonging to the image group, there is no image in which DF and BF exist in a preset ratio or images below a certain number exist, the apparatus increases k value by 1 and then may perform steps 1131 to 1135. For example, when steps 1133 and 1135 are performed for the image group (5, 5), steps 1133 and 1135 may be performed for an image group (7, 7) in which k value is increased by 1.

FIG. 12 is a diagram illustrating an example of the sample and sample plant in FIG. 3.

A sample 1201 or 1202 prepared on a sample plate 301 or 302 may be, for example, whole blood, plasma, serum, saliva, ocular fluid, cerebrospinal fluid, sweat, urine, milk, ascites fluid, synovial fluid, peritoneal fluid, a liquid sample of cell lysate, or a solid sample of a skin system sub-organ of tissue hair or the nail.

The optical system 300 may set a position 1230 or 1240 to be measured through a positioning algorithm.

The optical system 300 may acquire an image using light-emitting elements as a light source for the selected location.

Figure 13:
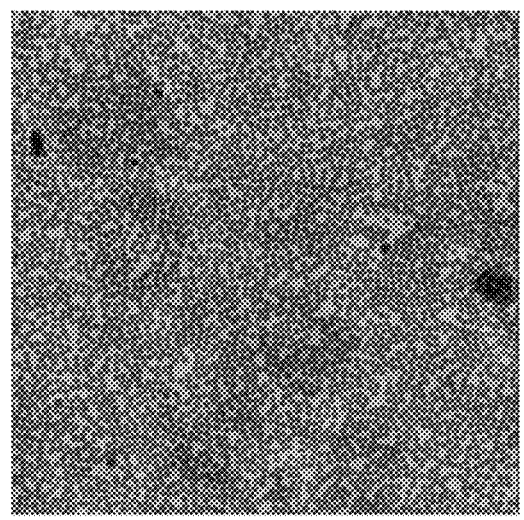
FIG. 13 illustrates an example of a low-resolution, large-area image according to an embodiment.
Figure 13:
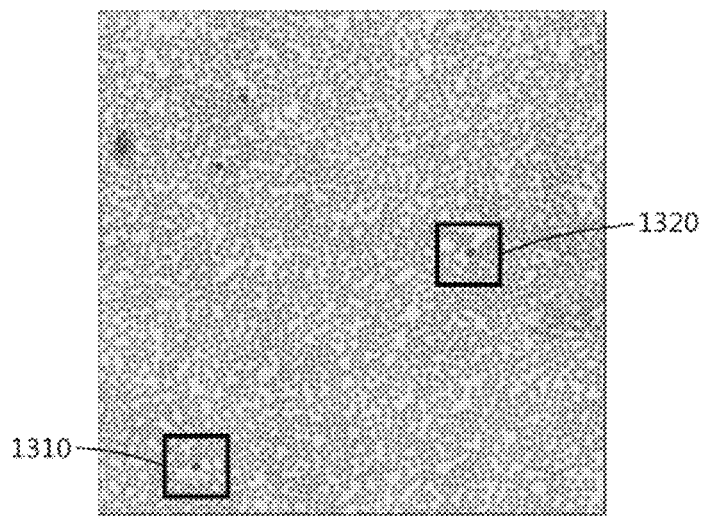

FIG. 13 illustrates an example of a low-resolution, large-area image according to an embodiment.

FIG. 13 illustrates an example of a low-resolution, large-area image of a blood sample reconstructed using some of all source images.

FIG. 13(A) shows an image of one of light-emitting elements (for example, a light-emitting element present at the center of the light-emitting elements) taken with a light source, and FIG. 13(B) shows an example of a low-resolution, large-area image acquired by performing FPM on images taken with 3×3 or 5×5 light-emitting elements as a light source.

In FIG. 13, partial regions corresponding to reference numerals 1310 and 1320 indicate leukocytes that are detection targets.

Figure 14:
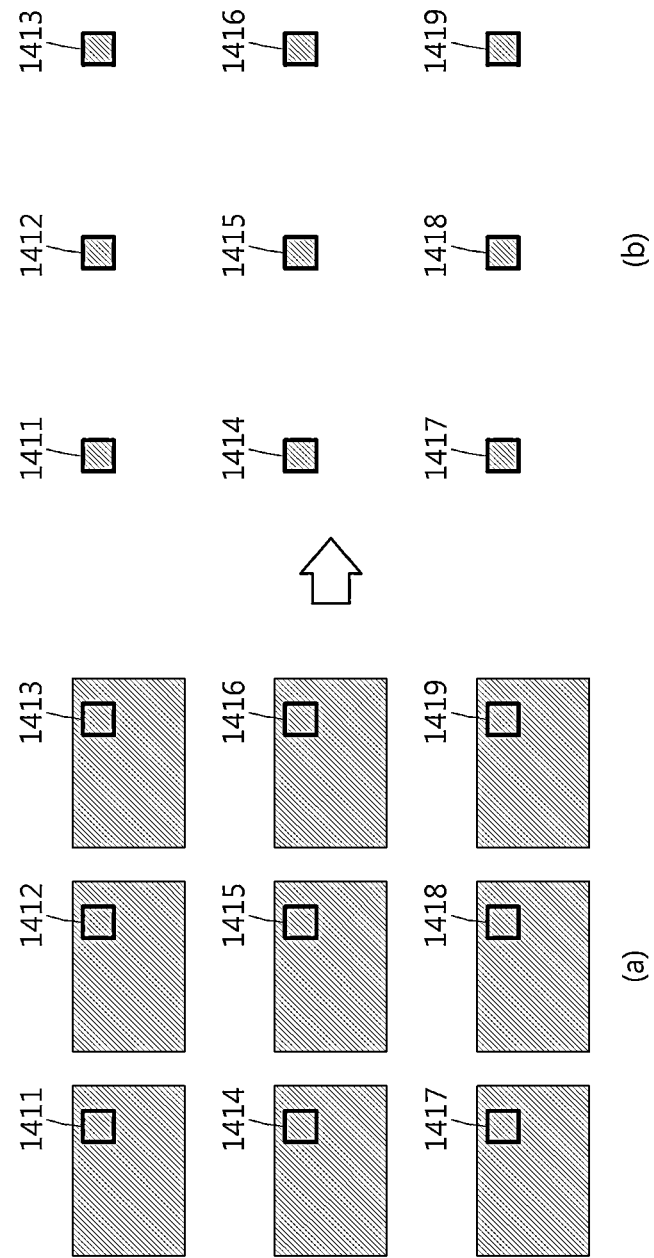
FIG. 14 is a diagram for explaining a method of acquiring a partial region image according to an embodiment.

FIG. 14 is a diagram for explaining a method of acquiring a partial region image according to an embodiment.

FIG. 14(A) illustrates nine source images corresponding to a 3×3 light-emitting element matrix. Accordingly, reference numeral 1415 denotes a partial region of a central image acquired by using a central light-emitting element as a light source. For example, reference numeral 1415 may be a region matching reference numeral 1310 in FIG. 13.

FIG. 14(B) shows partial-region images 1411, 1412, 1413, 1414, 1415, 1416, 1417, 1418 and 1419 respectively matching partial regions of 9 source images.

As described above, since the method of acquiring an image according to an embodiment of the present invention reconstructs a high-quality small-area image by using a partial region image from a source image, the amount of computation and the capacity of storage may be reduced.

Figure 15:
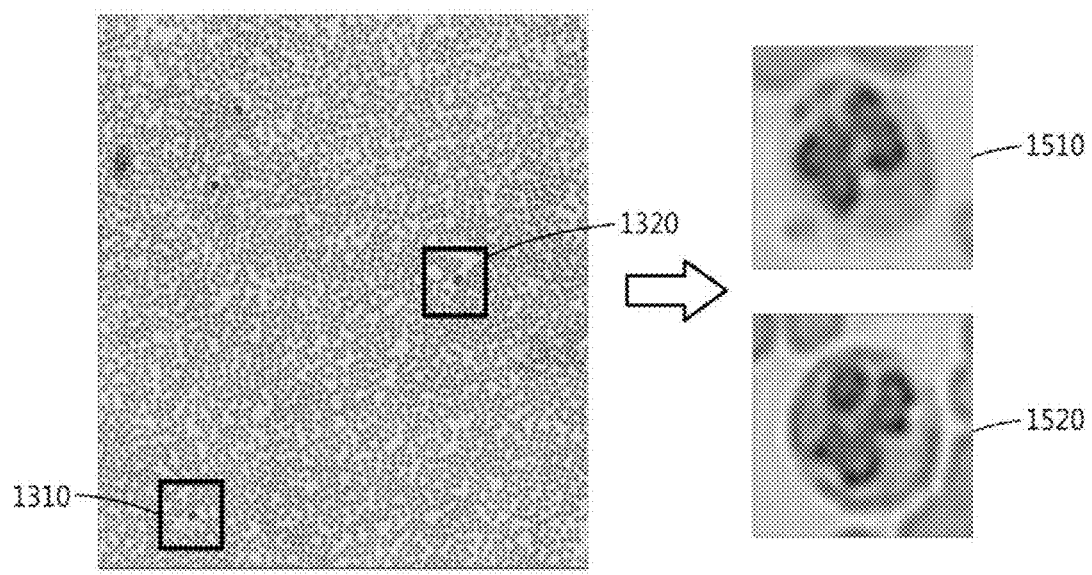
FIG. 15 is a diagram showing an example of a high-resolution image reconstruction for a partial region according to an embodiment.

FIG. 15 is a diagram showing an example of a high-resolution image reconstruction for a partial region according to an embodiment.

Referring to FIG. 15, it can be seen that high-quality small-area images (1510, 1520) can be reconstructed from a low-resolution, large-area image shown in FIG. 13.

FIG. 16 shows an example of an image reconstructed through general FPMP. FIG. 17 shows an example of an image reconstructed through APFMP according to an embodiment.

An image reconstructed through general FPMP may include ripples in an outer region of an image as shown in FIG. 16. However, through the ripple removal process 123 according to an embodiment of the present invention, it is possible to acquire an image in which ripples are removed as shown in FIG. 17.

Here, the "overlapping images" removed by the ripple removal process 123 or excluded by FPMP may be learned through machine learning or deep learning depending on a sample or the type of sample. Through this, the image corresponding to the image group index (2k+1, 2k+1) may be removed from the source images without detecting the DF and FB ratio of the source images depending on the sample or the sample type and the number of source images used.

For example, for a specific sample A, an image group (5, 5) may be removed from the source images or, for a specific sample B, an image group (7, 7) may be removed from the source images, or if the number of source images is more than 15×15, all image groups (5, 5), (9, 9), (13, 13) may be removed.

As described above, when "overlapping image" to be removed from the source images is determined in advance, the image acquirement process according to the embodiment of the present invention may proceed more quickly.

Figure 18:
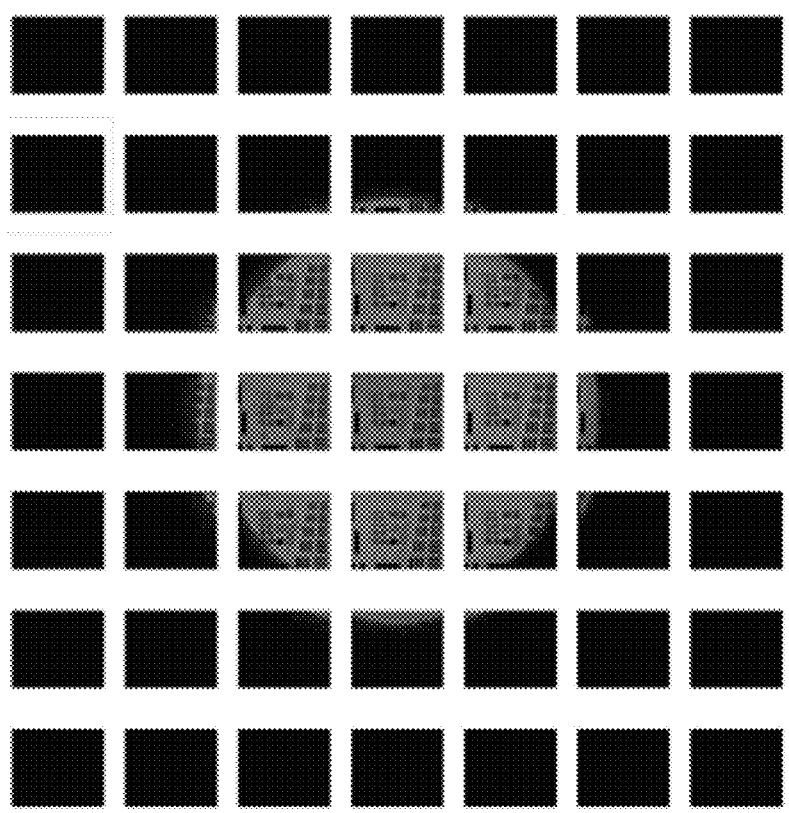
FIG. 18 shows an example of source images matched to respective positions of light-emitting elements.
Figure 19:
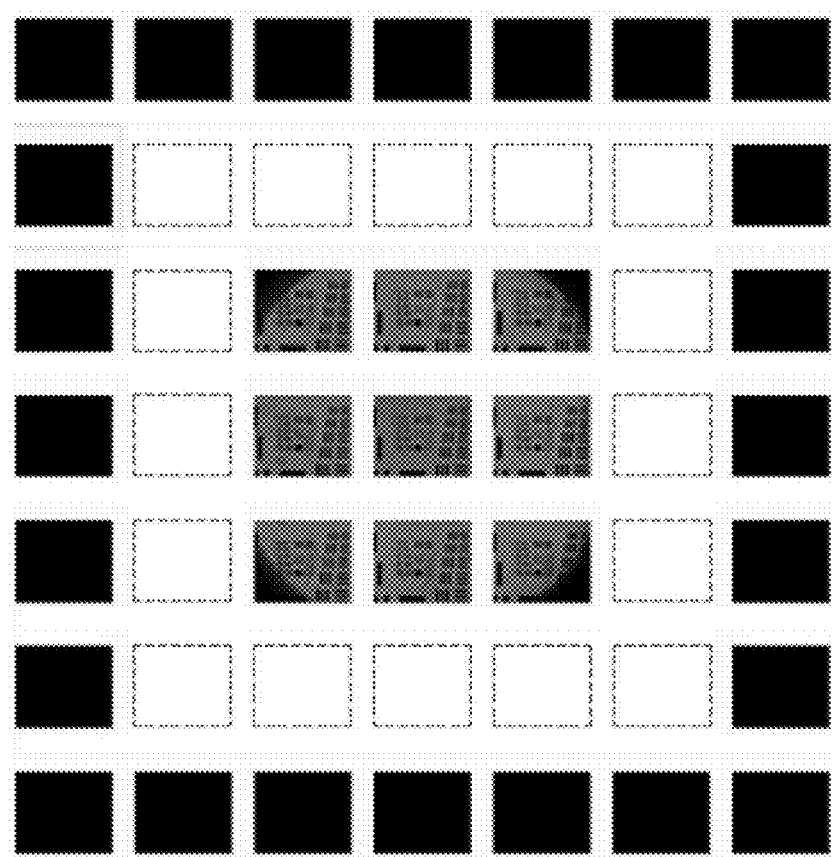
FIG. 19 is a diagram for explaining an example of remaining images used in an APFMP process according to an embodiment.

FIG. 18 shows an example of source images matched to respective positions of light-emitting elements. FIG. 19 is a diagram for explaining an example of remaining images used in an APFMP process according to an embodiment.

FIG. 18 illustrates 7×7 source images acquired from the same samples as those shown in FIG. 16 or 17.

The image acquirement apparatus 200 may detect the DF and BF ratio for each of 49 source images and may remove images corresponding to the image group index (5, 5) from the source images.

FIG. 19 shows a state in which the images corresponding to the image group index (5, 5) have been removed.

The image acquirement apparatus 200 may apply FPMP to 33 source images of "remaining images" except for 16 "overlapping images" from 49 source images.

As such, by excluding "overlapping images" and applying FPMP, the image quality of a reconstructed image may be improved by removing ripples, and the amount of computation and processing speed may also be improved by reducing the number of FPMP target images.

FPMP according to an embodiment of the present invention, which has improved processing speed and image quality compared to general FPMP, may be referred to as advanced FPMP.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

The invention claimed is:

1. A method of acquiring an image using a light-emitting element array, the method comprising:
   acquiring N×M source images of a sample using a light source of each of N×M (N and M are integers of 3 or more) light-emitting elements arranged in a matrix structure;
   selecting n×m (n is an integer less than N and m is an integer less than M) images among the source images based on a central image using a central light-emitting element, located at a center of the matrix structure, as a light source, performing a Fourier Ptychographic Microscopy Process (FPMP) on the n×m images, and reconstructing a low-resolution, large-area image;
   detecting a partial region containing a detection target object from the low-resolution large-area image, and acquiring partial-region images matching the partial region from each of the source images; and performing FPMP on the partial-region images and reconstructing a high-resolution image on the partial region, wherein the reconstructing of the high-resolution image on the partial region comprises:

determining overlapping images, in which a dark field (DF) and a bright field (BF) exist in a preset ratio, among the N×M source images, acquiring partial-region images from the remaining images except for the overlapping images among the N×M source images, and performing FPMP on partial-region images acquired from the remaining images except for the overlapping images, wherein the determining of the overlapping images comprises:

confirming an image group corresponding to an index (2k+1, 2k+1) assigned to an outer row and column image group from the central image based on an index (1,1) assigned to the central image;

confirming a DF and BF ratio of each image belonging to the image group corresponding to the (2k+1, 2k+1), and deleting the image group corresponding to the (2k+1, 2k+1) from the source images when the number of images having DF and BF in the preset ratio among images belonging to the image group is two or more, and wherein the source images are distinguished by indexes matching respective positions of N×M light-emitting elements arranged in a matrix form, an index assigned to the central image is (1,1), and an index assigned to an image group using light-emitting elements, arranged outside by k rows or k columns from the central light-emitting element, as a light source is (2k+1, 2k+1), where k=1,2,3 . . . (M−1)/2, and an image group corresponding to the (2k+1, 2k+1) is composed of {(2k+1)×(2k+1)}−{(2k−1)×(2k−1)} images.

2. The method according to claim 1, wherein the reconstructing of the low-resolution, large-area image comprises:

determining overlapping images, in which a dark field (DF) and a bright field (BF) exist in a preset ratio, among the n×m images; and performing FPMP on remaining images except for the overlapping images among the n×m images.

3. A method of acquiring an image using a light-emitting element array, the method comprising:

acquiring a plurality of source images by sequentially irradiating a sample with a plurality of light-emitting element light sources arranged in a light-emitting element array;

selecting some images from among the plural source images;

reconstructing a first image from the some images using a Fourier Ptychographic Microscopy Process (FPMP);

detecting a partial region containing a detection target object from the first image;

acquiring partial-region images corresponding to the partial region from each of the source images; and reconstructing a second image from the partial-region images using the FPMP, wherein the reconstructing of the first image comprises:

determining overlapping images, in which a dark field (DF) and a bright field (BF) exist in a preset ratio, from among the some images, wherein the determining of the overlapping images comprises:

confirming a central image using a central light-emitting element, located at a center of light-emitting elements arrangement, as a light source and confirming an image group corresponding to an index (2k+1, 2k+1) assigned to an outer row and column image group from the central image based on an index (1,1) assigned to the central image, confirming a DF and BF ratio of each image belonging to the image group corresponding to the (2k+1, 2k+1), and deleting the image group corresponding to the (2k+1, 2k+1) from the source images when the number of images having DF and BF in the preset ratio among images belonging to the image group is two or more, and wherein the source images are distinguished by indexes matching respective positions of N×M light-emitting elements arranged in the matrix form, an index assigned to the central image is (1,1), and an index assigned to an image group using light-emitting elements, arranged outside by k rows or k columns from the central light-emitting element, as a light source is (2k+1, 2k+1), where k=1,2,3 . . . (M−1)/2, and an image group corresponding to the (2k+1, 2k+1) is composed of {(2k+1)×(2k+1)}−{(2k−1)×(2k−1)} images.

4. The method according to claim 3, wherein the reconstructing of the first image comprises:

performing FPMP on remaining images except for the overlapping images among the some images.

5. The method according to claim 3, wherein the reconstructing of the second image comprises:

determining overlapping images, in which a dark field (DF) and a bright field (BF) exist in a preset ratio, among the source images;

acquiring partial-region images from the remaining images except for the overlapping images among the source images; and performing FPMP on partial-region images acquired from the remaining images except for the overlapping images.

6. A method of acquiring an image using a light-emitting element array, the method comprising:

acquiring a plurality of source images by sequentially irradiating a sample with a plurality of light-emitting element light sources;

determining overlapping images, in which a dark field and a bright field exist in a preset ratio, among the plural source images; and applying a Fourier Ptychographic Microscopy Process (FPMP) to remaining images except for the overlapping images among the plural source images and generating a reconstructed image, wherein the determining of the overlapping images comprises:

confirming a central image using a central light-emitting element, located at a center of light-emitting elements arrangement, as a light source and confirming an image group corresponding to an index (2k+1, 2k+1) assigned to an outer row and column image group from the central image based on an index (1,1) assigned to the central image, confirming a DF and BF ratio of each image belonging to the image group corresponding to the (2k+1, 2k+1), and deleting the image group corresponding to the (2k+1, 2k+1) from the source images when the number of images having DF and BF in the preset ratio among images belonging to the image group is two or more, and wherein the source images are distinguished by indexes matching respective positions of N×M light-emitting elements arranged in the matrix form, an index assigned to the central image is (1,1), and an index assigned to an image group using light-emitting elements, arranged outside by k rows or k columns from the central light-emitting element, as a light source is (2k+1, 2k+1), where k=1,2,3 ... (M−1)/2, and an image group corresponding to the (2k+1, 2k+1) is composed of {(2k+1)×(2k+1)}−{(2k−1)×(2k−1)} images.

7. The method according to claim 6, wherein the generating of the reconstructed image comprises:
selecting some images from among the remaining images based on a central image using as a central light-emitting element, located at a center of the light-emitting element array, as a light source;
performing FPMP on the some images and reconstructing a low-resolution, large-area image;
detecting a partial region containing a detection target object from the low-resolution, large-area image, and acquiring partial-region images matching the partial region from each of the remaining images; and
performing FPMP on the partial-region images and reconstructing a high-resolution image on the partial region.

8. An apparatus for acquiring an image, comprising:
an image acquirer configured to acquire N×M source images photographed using a light source of each of a plurality of light-emitting elements arranged in a light-emitting element array;
a storage configured to store the source images; and
a controller,
wherein the controller comprises at least one processor,
wherein the processor is configured to select n×m (n is an integer less than N and m is an integer less than M) images from among the source images based on a central image using a central light-emitting element, located at a center of the light-emitting element array, as a light source, to reconstruct a low-resolution, large-area image from the n×m images using a Fourier Ptychographic Microscopy Process (FPMP), to detect a partial region containing a detection target object from the low-resolution, large-area image, to acquire partial-region images matching the partial region from each of the source images; and to reconstruct a high-resolution image on the partial region using the FPMP,
wherein the controller determines overlapping images, in which a dark field (DF) and a bright field (BF) exist in a preset ratio, among the N×M source images, acquires partial-region images from the remaining images except for the overlapping images among the N×M source images, and performs FPMP on partial-region images acquired from the remaining images except for the overlapping images,
wherein the controller performs the following processes for determining the overlapping images:
confirming an image group corresponding to an index (2k+1, 2k+1) assigned to an outer row and column image group from the central image based on an index (1,1) assigned to the central image;
confirming a DF and BF ratio of each image belonging to the image group corresponding to the (2k+1, 2k+1); and deleting the image group corresponding to the (2k+1, 2k+1) from the source images when the number of images having DF and BF in the preset ratio among images belonging to the image group is two or more, and wherein the source images are distinguished by indexes matching respective positions of N×M light-emitting elements arranged in a matrix form, an index assigned to the central image is (1,1), and an index assigned to an image group using light-emitting elements, arranged outside by k rows or k columns from the central light-emitting element, as a light source is (2k+1, 2k+1), where k=1,2,3 ... (M−1)/2, and an image group corresponding to the (2k+1, 2k+1) is composed of {(2k+1)×(2k+1)}−{(2k−1)×(2k−1)} images.

9. The apparatus according to claim 8, wherein the controller determines overlapping images, in which a dark field (DF) and a bright field (BF) exist in a preset ratio, among the n×m images; and performs FPMP on remaining images except for the overlapping images among the n×m images.

10. An apparatus for acquiring an image, comprising:
an image acquirer configured to acquire a plurality of source images photographed using a light source of each of a plurality of light-emitting elements arranged in a light-emitting element array;
a storage configured to store the source images; and
a controller,
wherein the controller comprises at least one processor,
wherein the processor is configured to select some images from among the plural source images, located at a center of the light-emitting element array, as a light source, to reconstruct a first image from the some mages using a Fourier Ptychographic Microscopy Process (FPMP), to detect a partial region containing a detection target object from the first image, to acquire partial-region images corresponding to the partial region from each of the source images; and to reconstruct a second image from the partial region images using the FPMP,
wherein the controller determines overlapping images, in which a dark field (DF) and a bright field (BF) exist in a preset ratio, among some images;
wherein the controller is configured to:
confirm a central image using a central light-emitting element, located at a center of light-emitting elements arrangement, as a light source and confirming an image group corresponding to an index (2k+1, 2k+1) assigned to an outer row and column image group from the central image based on an index (1,1) assigned to the central image,
confirm a DF and BF ratio of each image belonging to the image group corresponding to the (2k+1, 2k+1), and
delete the image group corresponding to the (2k+1, 2k+1) from the source images when the number of images having DF and BF in the preset ratio among images belonging to the image group is two or more, and
wherein the source images are distinguished by indexes matching respective positions of N×M light-emitting elements arranged in a matrix form, an index assigned to the central image is (1,1), and an index assigned to an image group using light-emitting elements, arranged outside by k rows or k columns from the central light-emitting element, as a light source is (2k+1, 2k+1), where k=1,2,3 ... (M−1)/2, and an image group corresponding to the (2k+1, 2k+1) is composed of {(2k+1)×(2k+1)}−{(2k−1)×(2k−1)} images.

11. The apparatus according to claim 10, wherein the controller performs FPMP on remaining images except for the overlapping images among the some images.

12. The apparatus according to claim 10, wherein the controller determines overlapping images, in which a dark field (DF) and a bright field (BF) exist in a preset ratio, among the source images; acquires partial-region images from the remaining images except for the overlapping images among the source images; and performs FPMP on partial-region images acquired from the remaining images except for the overlapping images.

13. An apparatus for acquiring an image, comprising:
an image acquirer configured to acquire a plurality of source images photographed using a light source of each of a plurality of light-emitting elements arranged in a light-emitting element array;
a storage configured to store the source images; and
a controller,
wherein the controller comprises at least one processor,
wherein the processor is configured to determine overlapping images, in which a dark field and a bright field exist in a preset ratio, from among the plural source images, to apply a Fourier Ptychographic Microscopy Process (FPMP) to remaining images except for overlapping images among the plural source images, and to generate a reconstructed image,
wherein the controller is configured to:
confirm a central image using a central light-emitting element, located at a center of light-emitting elements arrangement, as a light source and confirming an image group corresponding to an index (2k+1, 2k+1) assigned to an outer row and column image group from the central image based on an index (1,1) assigned to the central image,
confirm a DF and BF ratio of each image belonging to the image group corresponding to the (2k+1, 2k+1), and
delete the image group corresponding to the (2k+1, 2k+1) from the source images when the number of images having DF and BF in the preset ratio among images belonging to the image group is two or more,
wherein the source images are distinguished by indexes matching respective positions of N×M light-emitting elements arranged in a matrix form, an index assigned to the central image is (1,1), and an index assigned to an image group using light-emitting elements, arranged outside by k rows or k columns from the central light-emitting element, as a light source is (2k+1, 2k+1), where k=1,2,3 . . . (M−1)/2, and an image group corresponding to the (2k+1, 2k+1) is composed of {(2k+1)×(2k+1)}−{(2k−1)×(2k−1)} images.

14. The apparatus according to claim 13, wherein the controller performs processes as follows for generating the reconstructed image:
selecting some images based on a central image using a central light-emitting element, located at a center of the light-emitting element array, as a light source among the remaining images;
performing FPMP on the some images and reconstructing a low-resolution, large-area image;
detecting a partial region containing a detection target object from the low-resolution, large-area image and acquiring partial-region images matching the partial region from each of the remaining images; and
performing FPMP on the partial-region images and reconstructing a high-resolution image for the partial region.

* * * * *